(12) United States Patent
O'Shea et al.

(10) Patent No.: US 12,486,040 B2
(45) Date of Patent: Dec. 2, 2025

(54) ARTIFICIAL POTENTIAL FIELD-BASED BOOM GUIDANCE FOR AUTOMATED AIR-TO-AIR REFUELING

(71) Applicant: The Boeing Company, Arlington, VA (US)

(72) Inventors: Daniel Michael O'Shea, Seattle, WA (US); Shawn M. Chamberlain, Federal Way, WA (US)

(73) Assignee: The Boeing Company, Arlington, VA (US)

( * ) Notice: Subject to any disclaimer, the term of this patent is extended or adjusted under 35 U.S.C. 154(b) by 392 days.

(21) Appl. No.: 18/172,701

(22) Filed: Feb. 22, 2023

(65) Prior Publication Data
US 2024/0278926 A1    Aug. 22, 2024

(51) Int. Cl.
*B64D 39/00*    (2006.01)
*B25J 9/02*    (2006.01)
*B25J 9/16*    (2006.01)

(52) U.S. Cl.
CPC .............. *B64D 39/00* (2013.01); *B25J 9/023* (2013.01); *B25J 9/1666* (2013.01)

(58) Field of Classification Search
None
See application file for complete search history.

(56) References Cited

U.S. PATENT DOCUMENTS

| | | | |
|---|---|---|---|
| 2020/0039076 A1* | 2/2020 | Tan ........................ | B25J 9/1697 |
| 2020/0086486 A1* | 3/2020 | Graichen ............... | B25J 9/1676 |
| 2021/0039804 A1* | 2/2021 | Ropers ................... | B64D 39/06 |
| 2021/0041243 A1* | 2/2021 | Fay ........................ | B25J 9/1664 |
| 2025/0018238 A1* | 1/2025 | Cerrano ................. | A62C 37/50 |

FOREIGN PATENT DOCUMENTS

JP    2019172409 A    * 10/2019

OTHER PUBLICATIONS

Souza et al., "Modified Artificial Potential Field for the Path Planning of Aircraft Swarms in Three-Dimensional Environments," Sensors, Feb. 17, 2022, 19 pages.
(Continued)

*Primary Examiner* — Christopher J Fibbi
(74) *Attorney, Agent, or Firm* — Hanley, Flight & Zimmerman, LLC (57) ABSTRACT

A trajectory planning system for a refueling boom includes a human-machine interface ("HMI") device and an electronic control unit ("ECU"). The HMI device outputs electronic control signals, in response to which the ECU performs a method. The ECU accesses a three-dimensional ("3D") boundary model of the receiver and a 3D model of the boom. The ECU calculates a boom-to-receiver relative position using the models and sensor data, and a planned trajectory between a boom tip and a receptacle on the receiver. The trajectory is calculated using the boom-to-receiver relative position and predictive artificial potential fields. A point is found on a baseline trajectory farthest from a straight line between the receptacle and boom tip, which is recorded as a temporary goal. The planned trajectory avoids contact between the boom and receiver features. The ECU executes a control action using the planned trajectory.

20 Claims, 6 Drawing Sheets

(56) References Cited

OTHER PUBLICATIONS

Szczepanski et al., "Energy Efficient Local Path Planning Algorithm Based on Predictive Artificial Potential Field," IEEE Access, vol. 10, Apr. 11, 2022, 14 pages.

Khatib, "Real-time Obstacle Avoidance for Manipulators and Mobile Robots," The International Journal of Robotics Research, MIT, vol. 5, No. 1, Spring 1986, 9 pages.

* cited by examiner

ARTIFICIAL POTENTIAL FIELD-BASED BOOM GUIDANCE FOR AUTOMATED AIR-TO-AIR REFUELING

BACKGROUND

Air-to-air refueling is the process by which aviation fuel is transferred from a fuel-supplying aircraft ("tanker") to a fuel-receiving aircraft ("receiver") while the tanker and receiver fly together in close formation. Air-to-air refueling allows the receiver to remain airborne for extended periods of time, or to increase its flight range relative to traditional stationary/ground-based refueling options.

During boom refueling in particular, aviation fuel is offloaded via an intervening boom apparatus ("refueling boom") from a fuel tank located aboard the tanker to a fuel tank of the receiver. The motion trajectory of the boom is typically controlled by-wire in response to manual or automated control inputs from one or more boom operators situated at a control station aboard the tanker. Using the control station, the boom operators carefully align a distal end ("boom tip") of the boom with a fuel receptacle on the receiver while respective pilots of the tanker and receiver minimize relative motion between the two aircraft. After alignment, the boom tip securely engages the receptable. Aviation fuel is then transferred to the receiver through a fuel conduit in the refueling boom.

Aboard a modern tanker, the aforementioned control station is typically located just aft of the tanker's cockpit. In this forward position, the refueling boom and the receiver are well outside of the direct view of the boom operators. The boom operators are therefore assisted in visualizing the boom and the receiver via a live video feed from one or more tanker-mounted cameras. Real-time image data of the boom and receiver, assisted by three-dimensional ("3D") receiver and boom models, are then projected onto high-resolution display screens of the control station. In this manner, the boom operators are able to monitor and control the aerial refueling process.

SUMMARY

The present disclosure relates to systems and methods for performing an aerial refueling process, in particular a boom-type automated air-to-air refueling ("A3R") operation during which a substantially rigid refueling boom is used to offload aviation fuel from a fuel-supplying aircraft ("tanker") to a fuel-receiving aircraft ("receiver"). In particular, the technical solutions described herein allow boom operators located aboard the tanker to guide the boom through free space along a planned motion trajectory. The planned trajectory in turn is calculated using predictive artificial potential fields ("APFs") to avoid collisions between the boom and the receiver. The planned trajectory in some embodiments can also prevent ingress of the boom into predefined "keep-out" zones around surfaces of the receiver acting as obstacles in the overall context of boom trajectory planning.

In a possible embodiment, a trajectory planning system for use with a fuel-supplying aircraft ("tanker") having a refueling boom configured for delivering aviation fuel to a fuel-receiving aircraft ("receiver") includes a human-machine interface ("HMI") device and electronic control unit ("ECU") in communication therewith. The HMI device is configured to output electronic control signals. The ECU, which is also in communication with a plurality of sensors operable for outputting sensor data, is configured, in response to the electronic control signals and the sensor data, to access a three-dimensional ("3D") receiver boundary model and a 3D boom model of the receiver and the refueling boom, respectively. The 3D receiver boundary model includes one or more receiver features.

The ECU in this particular embodiment also calculates a boom-to-receiver ("bTr") relative position using the 3D receiver boundary model, the 3D boom model, and the sensor data. Additionally, the ECU is configured to calculate a planned trajectory between a boom tip of the refueling boom and a receptacle of the receiver using the bTr relative position and predictive artificial potential fields ("APFs"). This action includes finding a point on a baseline trajectory of boom tip that is farthest from a straight line between the receptacle and the boom, recording the point on the baseline trajectory as a temporary goal, and shaping the planned trajectory to avoid contact between the boom and the one or more receiver features. The ECU then moves the boom tip toward the temporary goal.

A method is also disclosed herein for determining a planned trajectory of a boom tip of a refueling boom connected to a tanker when delivering aviation fuel to a receiver. An implementation of the method includes accessing a 3D receiver boundary model and a 3D boom model of the receiver and the refueling boom, respectively, via an ECU. The 3D receiver boundary model includes one or more predetermined receiver features. The method also includes calculating a bTr relative position via the ECU using the 3D receiver boundary model, the 3D boom model, and sensor data from a plurality of sensors, as well as calculating the planned trajectory between the boom tip and a receptacle of the receiver using the bTr relative position and predictive AFPs. As summarized above, this latter action includes finding a point on a baseline trajectory of the refueling boom that is farthest from a straight line between the receptacle and the boom, recording the point on the baseline trajectory as a temporary goal, and shaping the planned trajectory to avoid contact between the boom and the predetermined receiver features. The method includes executing a control action via the ECU using the planned trajectory, including moving the boom tip toward the temporary goal.

Another aspect of the disclosure includes a tanker having a fuselage, a refueling boom connected to the fuselage, a boom resolver, a camera, and a trajectory planning system. The fuselage is configured to transport aviation fuel. The boom resolver is connected to the fuselage and configured to measure a position of the refueling boom and output boom position signals indicative thereof. The camera is mounted to the fuselage and configured to output real-time image data of the refueling boom and a receiver. The trajectory planning system for its part includes an HMI device configured to output electronic control signals, and an ECU in communication with the HMI device, the boom resolver, and the camera.

The ECU in this embodiment is configured, in response to the electronic control signals, the boom position signals, and the real-time image data, to access a 3D receiver boundary model and a 3D boom model of the receiver and the refueling boom, respectively, with the 3D receiver boundary model including one or more predetermined receiver features. The ECU calculates a bTr relative position using the 3D receiver boundary model, the 3D boom model, the boom position signals, and the real-time image data, and also calculates a planned trajectory between a boom tip of the refueling boom and a receptacle of the receiver using the bTr relative position and predictive APFs. This action includes finding a point on a baseline trajectory of the refueling boom that is farthest from a straight line between the receptacle and the boom, recording the point on the baseline trajectory as a temporary goal, and shaping the planned trajectory to avoid contact between the boom and the one or more predetermined receiver features. The ECU then moves the boom tip toward the temporary goal.

The above summary is not intended to represent every possible embodiment or every aspect of the present disclosure. Rather, the foregoing summary is intended to exemplify some of the novel aspects and features disclosed herein. The features, functions, and advantages of the present disclosure can be achieved independently in various embodiments or may be combined in other embodiments, further details of which may be seen with reference to the following detailed description and accompanying drawings.

The present disclosure is susceptible to modifications and alternative forms, with representative embodiments shown by way of example in the drawings and described in detail below. Inventive aspects of this disclosure are not limited to the disclosed embodiments. Rather, the present disclosure is intended to cover alternatives falling within the scope of the disclosure as defined by the appended claims.

DETAILED DESCRIPTION

Embodiments of the present disclosure are described herein. It is to be understood, however, that the disclosed embodiments are illustrative examples, and that other embodiments can take various and alternative forms. The Figures are not necessarily to scale, and may be schematic. Some features may be exaggerated or minimized to show details of particular components. Therefore, specific structural and functional details disclosed herein are not to be interpreted as limiting, but merely as a representative basis for teaching one skilled in the art to variously employ the present disclosure.

Figures 1, 2:
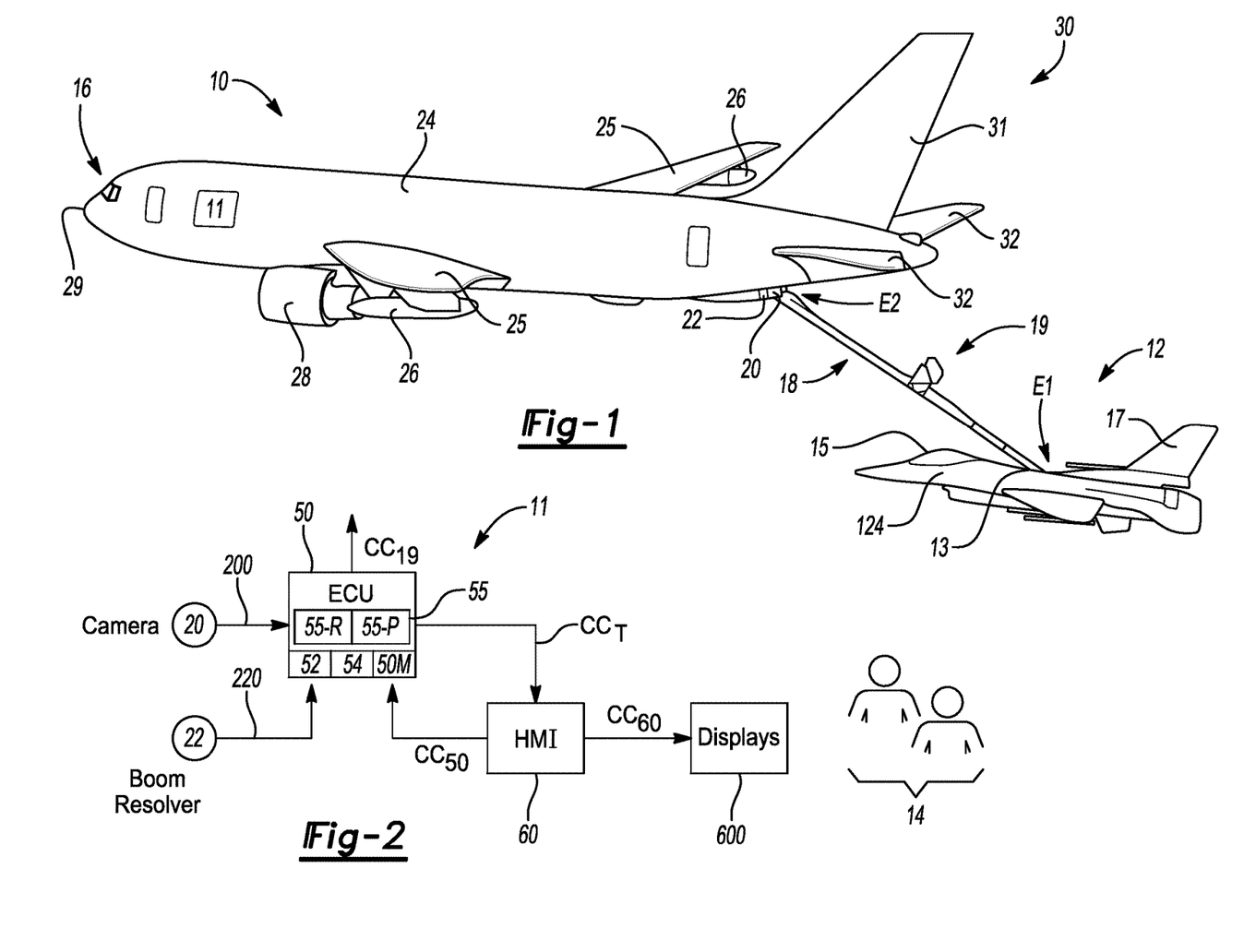
FIG. 1 illustrates a representative automated air-to-air ("A3R") refueling process during which a fuel-supplying aircraft ("tanker") delivers aviation fuel to a fuel-receiving aircraft ("receiver") through a refueling boom, the motion trajectory of which is planned herein using predictive artificial potential fields ("APFs").
FIG. 2 is a schematic flow diagram of an exemplary trajectory planning system operable for guiding the refueling boom of FIG. 1 during an A3R process using predictive APFs in accordance with the disclosure.

Referring to the drawings, wherein like reference numbers refer to the same or like components in the several Figures, and beginning with FIG. 1, a fuel-supplying aircraft ("tanker") 10 and a fuel-receiving aircraft ("receiver") 12 are shown engaged in a representative automated air-to-air refueling ("A3R") operation. Boom operators 14 (see FIG. 2), i.e., personnel trained to perform the disclosed aerial refueling tasks, are situated aboard the tanker 10, typically in proximity to/aft of a cockpit 16. The boom operators 14 control motion of a refueling boom 18 by-wire during the A3R operation as summarized above. In performing this task, the boom operators 14 of FIG. 2 are assisted in planning a motion trajectory of the refueling boom 18 by one or more cameras 20, a boom resolver 22, and a trajectory planning system 11 using predictive artificial potential fields ("APFs") as described in detail below with reference to FIGS. 2-7.

As appreciated in the art, APF-based collision avoidance techniques can be applied during end-effector path planning stages of robot control. Such techniques typically apply artificial attractive or repulsive potential fields around obstacles located in the end-effector's operational space. Trajectory planning occurs in programmed logic of a computational path planner. When planning an optimal trajectory for the end-effector, which in the present disclosure encompasses a distal end or "boom tip" E1 of the refueling boom 18 diametrically opposite a proximal/tanker-connected end E2, the APFs are designated in the airspace surrounding predetermined obstacles in the immediate vicinity of the boom 18, including its boom tip E1 and other structure.

Figure 4:
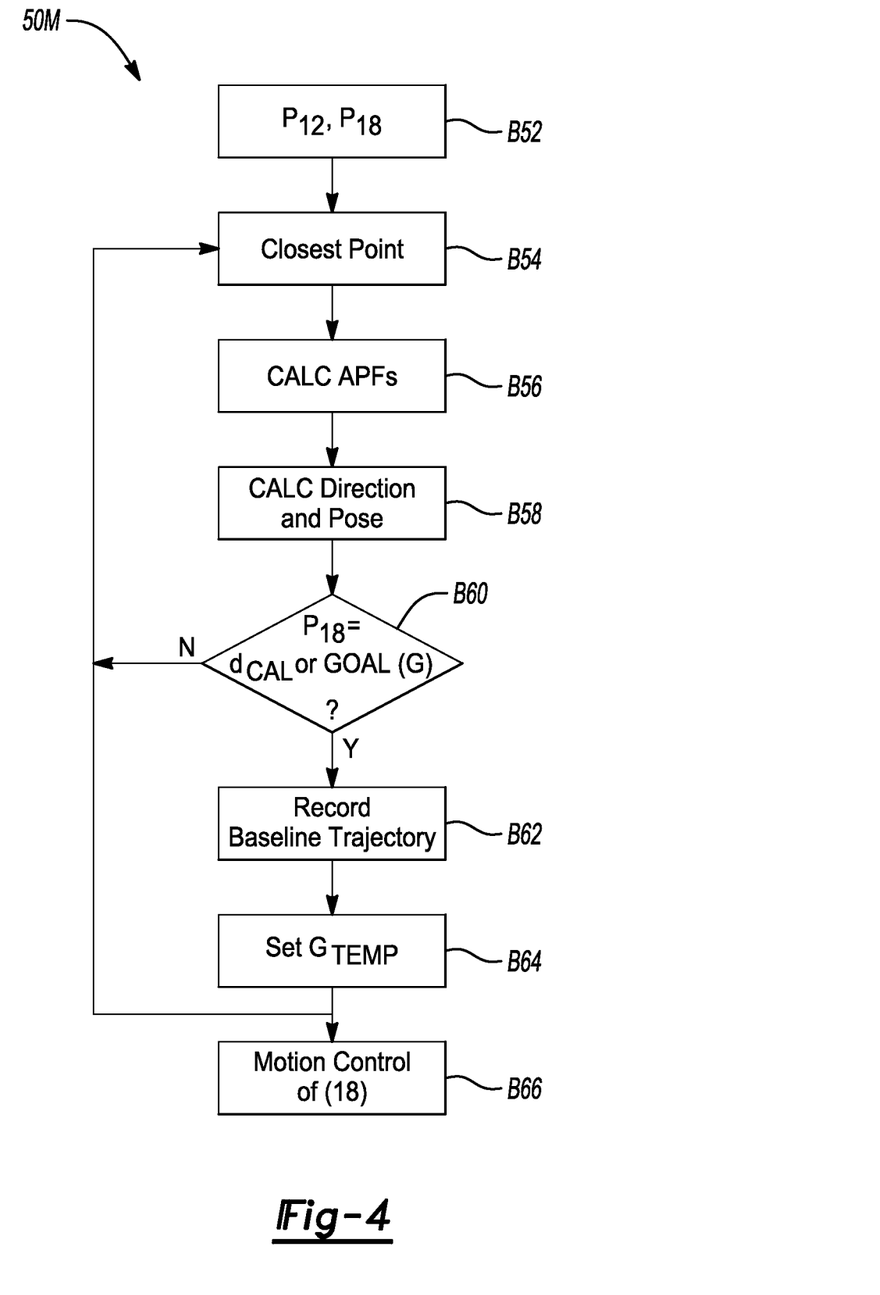
FIG. 4 is a flow chart describing an embodiment of a method for planning a boom trajectory using the trajectory planning system of FIG. 2.

To this end, APF techniques are specially modified as set forth herein for application as scalar potential fields to the 3D working airspace of the refueling boom 18. The "predictive APFs" of the present disclosure are thereafter used by the trajectory planning system 11 and/or the boom operators 14 of FIG. 2 to help guide the boom tip E1 toward and into engagement with a fuel receptacle 13 located on the receiver 12, while at the same avoiding obstacles in the path of the boom 18. Using the present trajectory planning approach, an example of which is shown in FIG. 4, relevant obstacles could include structural features of the receiver 12 that, at times, could be located in a line-of-sight with the boom tip E1, for instance a canopy 15, a vertical stabilizer 17, or an antenna (not shown) of the receiver 12.

Travel of the boom tip E1 and other structural portions or appendages of the refueling boom 18 near obstacles located in the airspace surrounding the receptacle 13 is effectively penalized in control logic of the trajectory planning system 11 to cause the refueling boom 18 to move away from such obstacles, and to thus deviate from a typical line-of-sight/straight-line path. This desired effect occurs via application of repulsive APFs around predefined obstacles. Conversely, movement of the boom tip E1 toward its intended target or goal, in this case the receptacle 13, is rewarded in logic using an attractive APF around the receptacle 13 and, as needed, one or more temporary goals as described below with reference to FIGS. 4, 6, and 7. The various APFs are then mathematically combined to shape the planned trajectory of the refueling boom 18, with the planned trajectory thereafter used to control flight inputs to flight control surfaces 19 and drive actuators (not shown) of the refueling boom 18.

During the A3R operation illustrated in FIG. 1, obstacles could include protruding flight control surfaces or other structure of the receiver 12 that may be located in a straight line/line-of-sight path between the boom tip E1 and the receptacle 13 or approach the longitudinal axis of the refueling boom 18. Using the APFs as modified herein, the trajectory planning system 11 causes the refueling boom 18 to follow the gradient of the potential fields when moving toward the receptacle 13, while at the same time avoiding the obstacles and thus collisions therewith.

In mathematical terms, the trajectory planning system 11 may calculate a net potential at the current 3D position of the refueling boom 18 before moving the boom 18 and its boom tip E1 in the direction of highest potential. More advanced implementations could consider the kinematics and flight dynamics of the refueling boom 18 as well as additional constraints. As a result, the planned trajectory of the boom tip E1 as determined by the trajectory planning system 11 would deviate from a straight-line path, with such a deviation depicted in FIGS. 6 and 7 and described in detail hereinbelow.

Further with respect to the representative tanker 10 of the FIG. 1, the tanker 10 includes a fuselage 24 connected to one or more wings 25. In the illustrated configuration, the fuselage 24 defines a cargo bay with one or more fuel tanks (not shown) holding aviation fuel for eventual delivery to the receiver 12. Each of the wings 25 may be connected in some configurations to a refueling pod 26 and one or more engines 28, e.g., jet turbines, with the engines 28 collectively providing sufficient thrust for propelling the tanker 10. The tanker 10 in one or more configurations could also deploy flexible drogues (not shown), with each drogue fluidly coupled to the refueling pods 26 or to the fuselage 24. The fuselage 24 also defines the cockpit 16 proximate a nose 29 of the tanker 10. At the opposite end of the tanker 10, an empennage assembly 30 is connected to the fuselage 24, with an empennage assembly 30 in the representative construction of FIG. 1 including a vertical stabilizer 31 and horizontal stabilizers 32.

The tanker 10 of FIG. 1 is equipped to perform A3R operations of the types contemplated herein, e.g., as a structurally-modified commercial passenger or transport aircraft having a reinforced airframe suitable for securely transporting the above-noted aviation fuel and associated fuel tanks, and equipped with mission-suitable avionics and control systems. Such modifications collectively enable the tanker 10 to transport aviation fuel to a predetermined rendezvous site with the receiver 12. Upon reaching the rendezvous site, the tanker 10 flies in close formation with the receiver 12, the particular configuration of which may differ from that which is depicted in FIG. 1. For example, the tanker 10 may be used to refuel any suitably-equipped receiver 12, such as but not limited to cargo planes, other tankers, surveillance and/or reconnaissance aircraft, air traffic control aircraft, weather monitoring aircraft, etc. The depicted construction of the receiver 12 of FIG. 1 is therefore illustrative of just one possible embodiment thereof.

The refueling boom 18 moves within the slipstream of the tanker 10 with a level of control afforded by the flight control surfaces 19. Control inputs to the flight control surfaces 19 are transmitted by-wire from operator inputs from the boom operators 14 of FIG. 2, with the end result being the guidance of the boom tip E1 into mating engagement with the receptacle 13. In the non-limiting embodiment of FIG. 1, the receptacle 13 is located on a fuselage 124 of the receiver 12 aft of the canopy 15. However, the actual location of the receptacle 13 will vary with the particular construction of the receiver 12, and therefore FIG. 1 illustrates just one possible embodiment.

Referring now to FIG. 2, during the A3R operation represented in FIG. 1, the tanker 10 deploys the refueling boom 18 under the close observation and control of the boom operators 14. The boom operators 14 are assisted in their task by real-time image data 200 of the boom 18 and the receiver 12 collected by the camera(s) 20. Each camera 20 is securely mounted to the tanker 10 of FIG. 1 on or near the proximal end E2 of the boom 18 and communicated to an electronic control unit ("ECU") 50 for image processing.

Within the scope of the present disclosure, the real-time image data 200 is used by the trajectory planning system 11 to calculate a planned trajectory of the refueling boom 18, which is ultimately used to control motion of the boom 18 via one or more rotary and/or linear actuators (not shown) and its flight control surfaces 19. The present strategy may be contrasted with typical line-of-sight approaches which attempt to maneuver a robot end-effector in a straight line to a goal (see FIG. 6). A drawback of such an approach if applied to the A3R process of FIG. 1 is a potential collision of the boom 18 of FIG. 1 with potentially obstructing components of the receiver 12.

The trajectory planning system 11 as contemplated herein employs automated computer vision/machine learning-based solutions, 3D modeling, and predictive APFs determined in accordance with the method 50M to help plan an optimal trajectory for the refueling boom 18 as the boom 18 travels toward engagement with the receptacle 13 of FIG. 1. To that end, the trajectory planning system 11 includes the above-noted ECU 50, which in turn is in wired or wireless/remote communication with the camera(s) 20. Each camera 20 in turn may be embodied as rearward-facing monocular cameras of an application-specific spectral capability. For example, the camera(s) 20 could be configured to collect the real-time image data 200 in a human-visible/red-green-blue ("RGB") spectral range, or using near-infrared ("near-IR"), infrared ("IR"), or other portions of the electromagnetic spectrum.

The boom resolver 22 for its part acts as an additional data source. The boom resolver 22 may be configured as a rotary position sensor or encoder configured to measure an angular position of the refueling boom 18 of FIG. 1 in free space, and to report the measured position to the ECU 50 as boom position data 220. The boom operators 14, suitably informed by the real-time image data 200 and the boom position data 220, then impart electronic control signals ($CC_{50}$) to the ECU 50 using a human-machine interface ("HMI") device 60, which likewise is in wired or wireless communication with the ECU 50.

Constituent two-dimensional ("2D") image frames of the real-time image data 200 contain therein digital pixel images of at least the receiver 12 and the refueling boom 18. The trajectory planning system 11 of FIG. 2 ultimately outputs a real-time trajectory graphic ($CC_T$) indicative of the planned trajectory, e.g., a suitable graphical overlay, annotation, and/or text message, to the HMI device 60 to assist the boom operators 14 in visualizing and flying the boom 18 to the receptacle 13 shown in FIG. 1. The ECU 50 ultimately transmits boom control signals (arrow $CC_{19}$) by-wire to the flight control surfaces 19 of the boom 18 illustrated in FIG. 1. The boom operators 14 could accomplish this task aided refueling by the trajectory graphic ($CC_T$) in one or more embodiments, for instance as trajectory guidelines forming a recommended directional "roadmap" or virtual runway leading to the receptacle 13, while fully autonomous control of the boom 18 could use the calculated boom trajectory in a different manner, e.g., as a path planning control input.

The HMI device 60 of FIG. 2 in one or more embodiments could include, by way of example and not of limitation, one or more high-resolution display screens ("Displays") 600 controllable via display input signals ($CC_{60}$), e.g., touch-sensitive screens, as well as keyboards, joysticks, dials, etc. Ultimately, the electronic control signals ($CC_{50}$) from the HMI device 60 will cause the ECU 50, using a processor 52 and memory 54, to electronically control a corresponding attitude of the flight control surfaces 19 of FIG. 1 via the boom control signals ($CC_{19}$). In other words, the refueling boom 18 is controllable in a fly-by-wire manner such that a physical kinematic chain does not exist between the boom operators 14 and the boom 18 of FIG. 1. Other control implementations may be envisioned within the scope of the disclosure, including semi-autonomous or fully-autonomous control implementations, and therefore the present solutions are not limited to crewed aerial refueling operations as described herein.

The ECU 50 depicted in FIG. 2 operates herein as a trajectory planning controller, and may be optionally embodied as one or more computer systems configured to execute computer-readable instructions embodying the method 50M, a non-limiting exemplary embodiment of which is described below with reference to FIG. 4. As contemplated herein, the processor(s) 52 may be implemented as a microcontroller, one or more Application Specific Integrated Circuit(s) (ASICs), Field-Programmable Gate Array (FPGAs), electronic circuits, central processing units (CPUs), etc. The memory 54 in turn includes associated transitory and non-transitory memory/storage component(s), e.g., read only memory, programmable read only memory, solid-state memory, random access memory, optical and/or magnetic memory, etc. Computer-readable instructions embodying the method 50M may be recorded in the memory 54 and executed by the processor(s) 52, e.g., as machine-readable code/instructions, software, and/or firmware programs.

Other hardware components of the schematically-depicted ECU 50 are omitted for simplicity but are well understood in the art, such as combinational logic circuits, input/output (I/O) circuits, digital and analog signal conditioning/buffer circuitry, and other hardware components that may be accessed as needed by the processor(s) 52 to provide the control functionality described herein. Execution of the method 50M as set forth herein also requires, in one or more embodiments, one or more 3D models 55, including a 3D model 55-B (hereinafter referred to as a "3D boom model") of the refueling boom 18 and a 3D model 55-R (hereinafter a "receiver boundary model") of one or more designated "keep out" zones around the receiver 12 of FIGS. 1 and 5C, the alternatively constructed receiver 120 modeled in FIGS. 5A and 5B, or a receiver aircraft of a different construction than those exemplified herein, e.g., another tanker 10 or an aircraft lacking the canopy 15.

Figure 3:
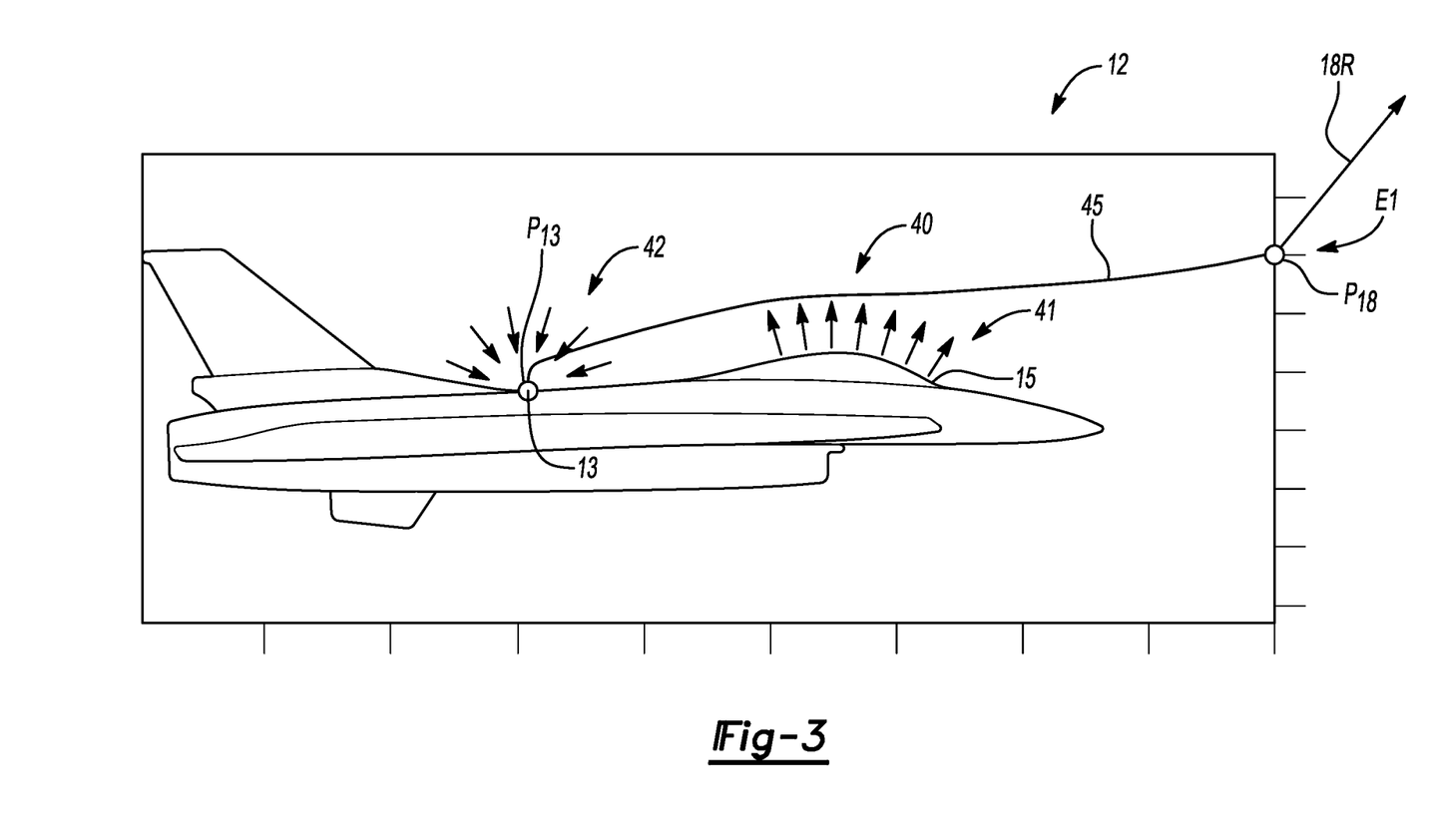
FIG. 3 is an illustration of a representative receiver and a boom motion trajectory, the latter being determined using the exemplary trajectory planning system of FIG. 2.

Referring to FIG. 3, a silhouette 40 of a model of the receiver 12 is shown relative to the boom tip E1 of the refueling boom 18 shown in FIG. 1, with the refueling boom 18 depicted in FIG. 3 as a ray 18R pointing in the direction of the tanker 10, i.e., along a logitudinal axis of the boom 18. When maneuering the boom 18 into eventual engagement with the receptacle 13, the boom operators 14 of FIG. 2 would ordinarily determine an optimal trajectory. Quite often, this includes resorting to the aforementioned line-of-sight/straight line trajectory planning strategy. The trajectory planning system 11 of FIG. 2 as contemplated herein in contrast accomplishes this task in a different manner: by applying predictive APFs in lieu of conventional straight-line APFs to shape a planned trajectory 45 of the boom 18, i.e., into a curvlinear path through free space that the boom tip E1 will travel until engagement with the receptacle 13.

In general, APFs are artificial forces characterized as being either attractive or repulsive. Mathematically, an APF can be expressed as:

$$U(x, y) = Ua(x, y) + Ur(x, y)$$

where Ua(x,y) and Ur(x,y) are the attractive potential and the repulsive potential, respectively. The attractive potential Ua(x,y) in turn is defined as:

$$Ua(x, y) = Ka * \ln(d(x, y, xg, yg))$$

where (xg, yg) are the corresponding coordinates of the goal point, i.e., the point in space corresponding to the receiver 12, and d(x, y, xg, yg) represents the Euclidean distance between the current position (x, y) of the boom tip E1 and the goal point. In the above equation, Ka is a positive constant that determines the strength of the attractive APF. Similarly, the repulsive potential Ur(x, y) is defined as follows:

$$Ur(x, y) = Kr * \frac{1}{d}(x, y, xi, yi)^2$$

where (xi, yi) are the corresponding coordinates of the $i^{th}$ obstacle, d(x, y, xi, yi) is the Euclidean distance between the current position (x, y) of the boom tip E1 and the $i^{th}$ obstacle, and Kr is a positive constant analogous to the above-noted constant Ka, which in this case determines the strength of the repulsive force. The gradient of the APF can be used to compute the direction of the next move of the refueling boom 18 of FIG. 1, with the trajectory planning system 11 of FIG. 2 iteratively updating the current position of the boom tip E1 based on the gradient of the APF until the goal point/receptacle 13 is reached, or until reaching a maximum number of iterations.

In FIG. 3, attactive force field lines 42 for an applied attractive APF are depicted radiating toward the receptacle 13, or rather a point $P_{13}$ coinciding therewith. Repulsive forces are shown as repulsive force field lines 41 radiating away from obstacles disposed between the boom tip E1 (point $P_{18}$) or other structure of the refueling boom 18 and the receptacle 13, with the refueling boom 18 represented as the above-noted ray 18R. In a non-limiting example, the obstacle during an A3R operation may include the canopy 15 when present on the receiver 12, e.g., a transparent bubble canopy enclosing a cockpit of the receiver 12 as appreciated in the art. The dome-like shape of the canopy 15 could project into a line-of-sight trajectory between the boom tip E1 and the receptacle 13, and thus increases the risk of a collision with the refueling boom 18. As part of the present method 50M, the various APFs are summed together and thereafter used to shape the planned trajectory 45.

Referring to FIG. 4, an embodiment of the method 50M is illustrated as a series of flow steps or logic blocks for illustrative simplicity. As used herein, the term "block" refers to algorithms or computer-executable code segments, sequences, or other constituent portions of the method 50M. The individual logic blocks are implemented by the ECU 50 of FIG. 2 to perform the method 50M.

Commencing with block B52 ("$P_{12}$, $P_{18}$"), the method 50M includes receiving the real-time image data 200 from the camera(s) 20 of FIGS. 1 and 2 via the ECU 50, as well as receiving the boom position data 220 from the boom resolver 22. The real-time image data 200 as contemplated herein includes the constituent digital image frames of a video feed from the camera(s) 20. The camera(s) 20 may include one or more rearward-facing monocular cameras as noted above. For instance, the camera(s) 20 may be part of an aircraft-mounted vision system providing the boom operators 14 of FIG. 2 with a high-definition real-time view of the receiver 12 and the refueling boom 18, and allowing the boom operators 14 to control motion of the boom 18 using the live/real-time image feed.

As part of block B52, the ECU 50 uses programmed vision and image processing capabilities to determine respective positions $P_{12}$ and $P_{18}$ of the receiver 12 and the refueling boom 18 in free space aft of the tanker 10, i.e., as corresponding 3D coordinate sets on the 3D receiver boundary model 55-R and the 3D boom model 55-B. The method 50M proceeds to block B54 once the ECU 50 has ascertained the positions $P_{12}$ and $P_{18}$.

Block B54 ("Closest Point") entails processing the real-time image data 200 and the boom position data 220 from block B52 and accessing the 3D models 55, i.e., the 3D reciever boundary model 55-R and the 3D boom model 55-B, with the ECU 50 identifying the closest point of the 3D models 55 using this information. In particular, block B54 includes calculating a boom-to-receiver ("bTr") relative position using the 3D receiver boundary model 55-R and the 3D boom model 55-B to determine the closest point on the 3D receiver boundary model 55-R to the 3D boom model 55-B, e.g., using a geometric calculation based on the predetermined geometries and a common coordinate system of the respective 3D receiver boundary and boom models 55-R and 55-B. Block B54 would also entail calculating the closest point on the boom model 55-B to the receiver boundary model 55-R.

Figures 5A, 5B:
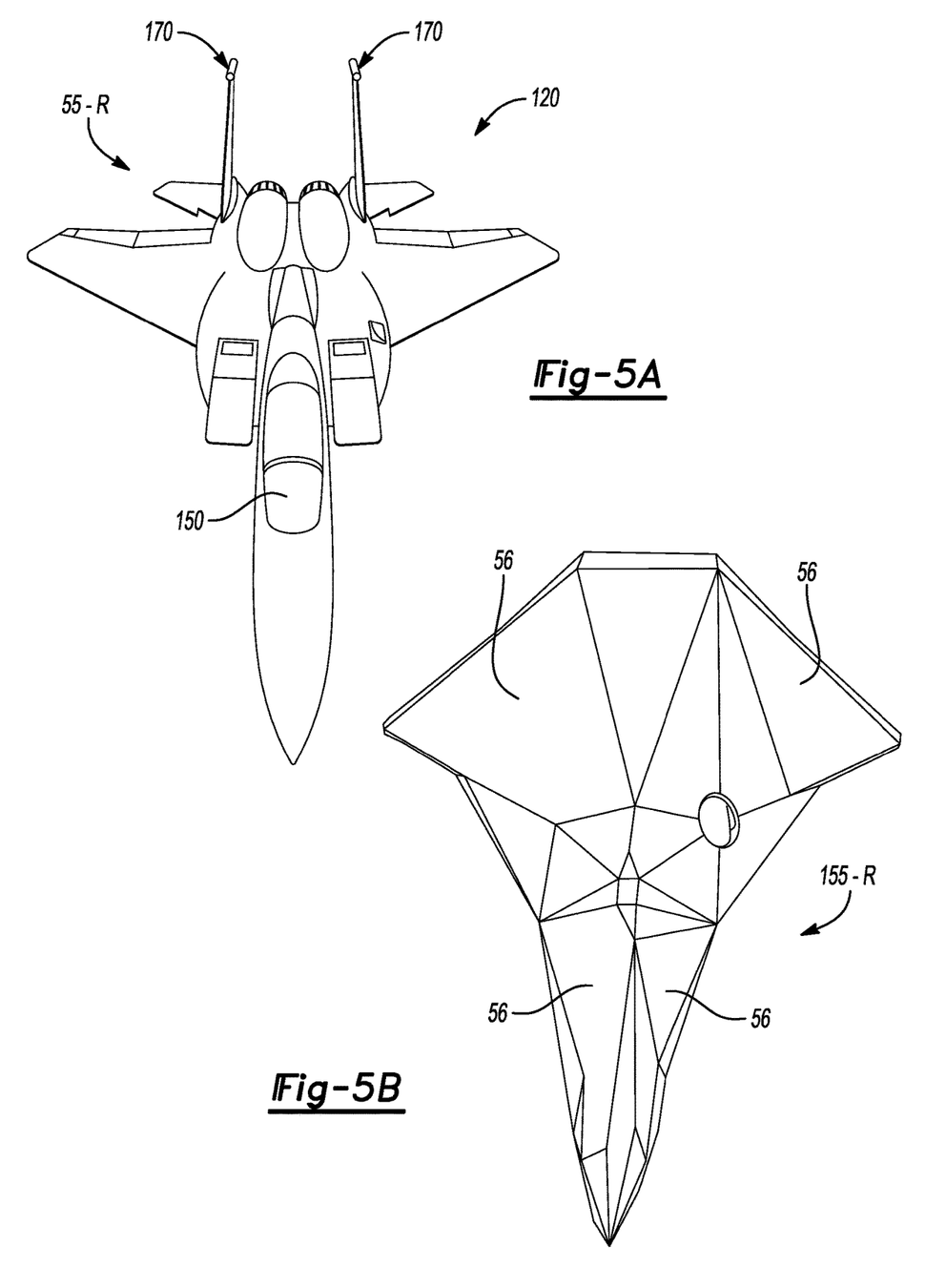
FIGS. 5A, 5B, and 5C are three-dimensional ("3D") boundary models for a representative receiver, with the 3D receiver boundary models being configured for use with the representative trajectory planning system of FIG. 2.

Referring briefly to FIG. 5A, the 3D receiver boundary model 55-R may be embodied as a 3D solid or digital wire model, e.g., a computer-aided design ("CAD") model, that the ECU 50 references when identifying the closest points in block B54. The 3D receiver boundary model 55-R envelops external structural features of the receiver 12 or airspace around the receiver 12 to ensure collision-free guidance of the refeling boom 18 during the A3R process. Such points are potential contact locations to be avoided. In different embodiments, the 3D receiver boundary model 55-R may be a precise representation of all external surfaces of the receiver 12, e.g., as shown in FIG. 5A for a representative receiver 120 having different configuration than the receiver 12 of FIG. 1.

Alternatively as shown in FIG. 5B, a simpler/coarser but faster-executing 3D receiver boundary model 155-R of the receiver 120 could be used. Such a 3D receiver boundary model 155-R may be embodied as a simplified mesh representation that encloses the outer dimensions or full envelope of the actual receiver 12 and additional surrounding space, i.e., designated "keep out zones" 56 around the receiver 12. As an example, the 3D receiver boundary model 55-R of FIG. 5A may be a complex or multi-faceted model having upwards of 40,000 facets, while the simplified mesh embodiment of FIG. 5B could be implemented with as fewer than about 500 facets, e.g., 200-300 facets.

Figure 5C:
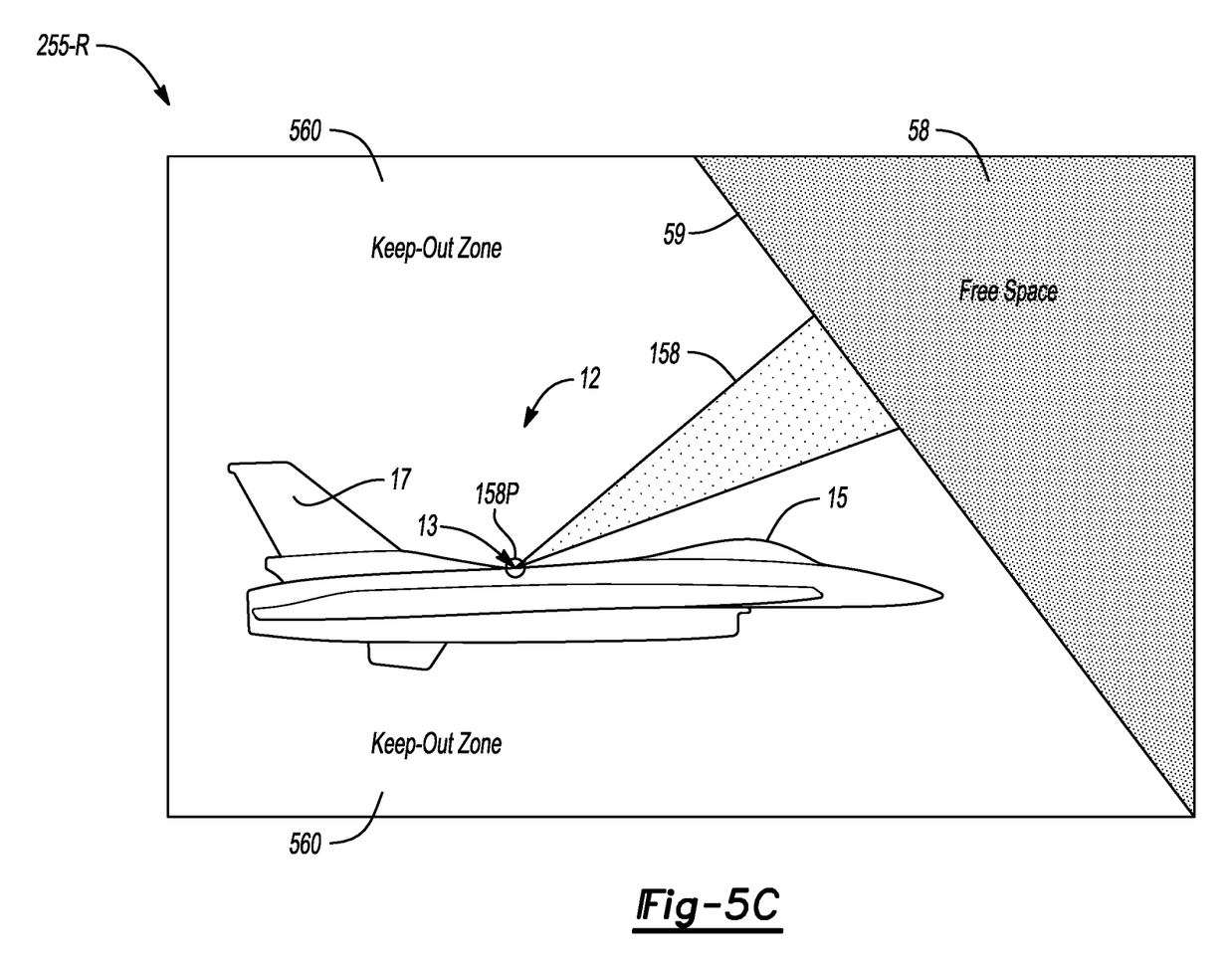

Referring briefly to FIG. 5C, one skilled in the art could instead implement the receiver boundary model 55-R using even fewer facets. As with FIGS. 5A and 5B, a receiver boundary model 255-R defines boundaries around the receiver 12 where the refueling boom 18 of FIG. 1 is not permitted to go. As with the receiver boundary models 55-R and 155-R, the receiver boundary model 255-R could be implemented as a triangulated mesh with normal vectors that point away from designated keep-out zones, which in FIG. 5C are implemented as keep-out zones 560 fully surrounding the receiver 12. As depicted in FIG. 5C, a plane 59 separates the keep-out zones 560 from other airspace ("Free Space") 58 in which the refueling boom 18 of FIG. 1 is permitted to freely maneuver. Penetrating the plane 59 is a hollow pyramid 158 having a terminal point 158P at the receptacle 13. The pyramid 158 clears a space that coincides with the volume in which the boom 18 can maneuver while coupled to the receiver 12 in the defined disconnect envelope. In this embodiment, a highly detailed 3D model of the receiver 12, shown in FIG. 5C solely for context, is not required to be part of the receiver boundary model 255-R. This same concept can be applied to an enclosed volume (not shown). As a result, the receiver boundary model 255-R may be described by very few facets or triangles, e.g., 10-20, which is computationally advantageous for the present guidance law.

Thus, FIGS. 5A, 5B, and 5C represent different levels of detail possible within the scope of the disclosure. The 3D receiver boundary models 55-R, 155-R, or 255-R thus could be augmented to define the keep-out zones 56 or 560 to as great of a degree, and to thus shape the eventual boom trajectory as desired. For example, the 3D receiver models 55-R, 155-R, or 255-R could encompass a bubble or bump over exposed canopy 150, antenna locations (not shown), or between vertical stabilizers 170 as shown in FIG. 5A. The 3D receiver boundary models 155-R and 155-R may be constructed as a virtual fence around the receiver 120 that, due to implementation of the method 50M, will not be penetrated by the refueling boom 18 of FIG. 1 during the A3R process. The method 50M thereafter proceeds to block B56.

Referring again to FIG. 4, at block B56 ("Calc APFs"), the ECU 50 next begins to calculate a planned trajectory between the boom tip E1 and the receptacle 13 of the receiver 12 using the aforementioned bTr relative position and predictive artificial potential fields ("APFs") as noted above. In doing so, the ECU 50 estimates the size and direction of net forces from such APFs. As appreciated in the art, APFs can be used for path planning of a robot end-effector by defining a scalar potential function that describes the attraction or repulsion of the end-effector, or other links in the kinematic chain, to different locations or objects in the robot's environment. The typical approach is modified in the present control scheme in which the robot in question is the refueling boom 18, the end-effector being controlled is the boom tip E1, and the motion target or goal is the receptacle 13. Obstacles in this use scenario include prior-identified external surfaces of the receiver 12 that could at times be present in a line-of-sight between the boom tip E1 and the receptacle 13.

The goal in this particular case is represented by a local minimum of the above-noted potential function, while the obstacles are represented by local maxima. Motion of the refueling boom 18 is thus guided via operation of the ECU 50 by the gradient of the potential function, with the boom 18 ultimately moving in the direction of steepest descent towards the goal while avoiding any predefined obstacles. The method 50M then proceeds to block B58.

At block B58 ("Calc Direction and Pose"), the ECU 50 of FIG. 2 next uses the 3D boom model 55-B to estimate the particular direction and distance that the refueling boom 18 would move, assuming that the APFs were to be applied as an actual net force. The ECU 50 then updates the orientation or pose of the 3D boom model 55-B by moving the boom tip E1 over the same estimated distance in the direction of the estimated net forces. The method 50M then proceeds to block B60.

Block B60 ("$P_{18}=d_{CAL}$ or Goal?") includes determining via the ECU 50 whether the boom tip E1 in the corresponding 3D boom model 55-B has moved through the calculated distance of block B58, i.e., $d_{CAL}$, or has reached its final target, i.e., the receptacle 13. The ECU 50 repeats blocks B54, B56, and B58 until this condition has been satisfied. The method 50M then proceeds to block B62.

At block B62 ("Record Baseline Trajectory"), the ECU 50 records the preceeding movement sequence as a baseline trajectory in memory 54. The method 50M thereafter proceeds to block B64.

Block B64 ("Set $G_{TEMP}$") includes finding the point on the baseline tajectory from block B60 that is farthest from the line-of-sight or straight line between the receptacle 13 and the boom tip E1 at the latter's current position. This point is then recorded in memory 54 of the ECU as a temporary goal ($G_{TEMP}$). The method 50M then returns to block B54 and proceeds at the same time to block B66.

Block B66 ("Motion Control of (18)") entails inputting the temporary goal from block B62 to existing control laws used to govern motion of the refueling boom 18, i.e., the speed, pitch, yaw, roll, and X, Y, and Z coordinate motion commands ultimately regulating the flight control surfaces 19 as appreciated in the art. Thus, block B66 includes moving the boom tip E1 to the temporary goal of block B64 as a control action.

Figure 6:
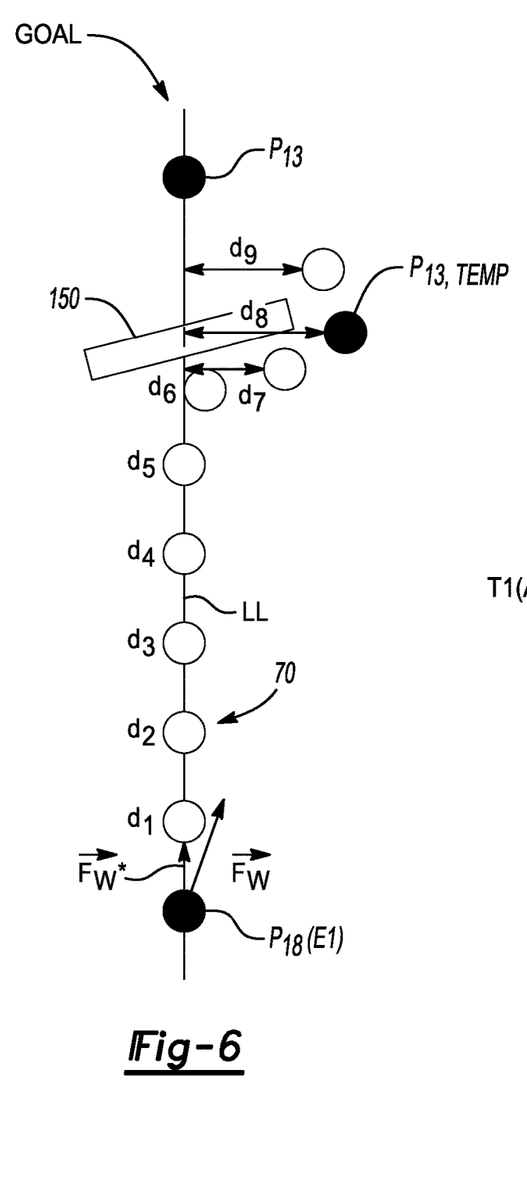
FIGS. 6 and 7 illustrate a planned boom trajectory determined using the predictive APFs of the present disclosure.
Figure 7:
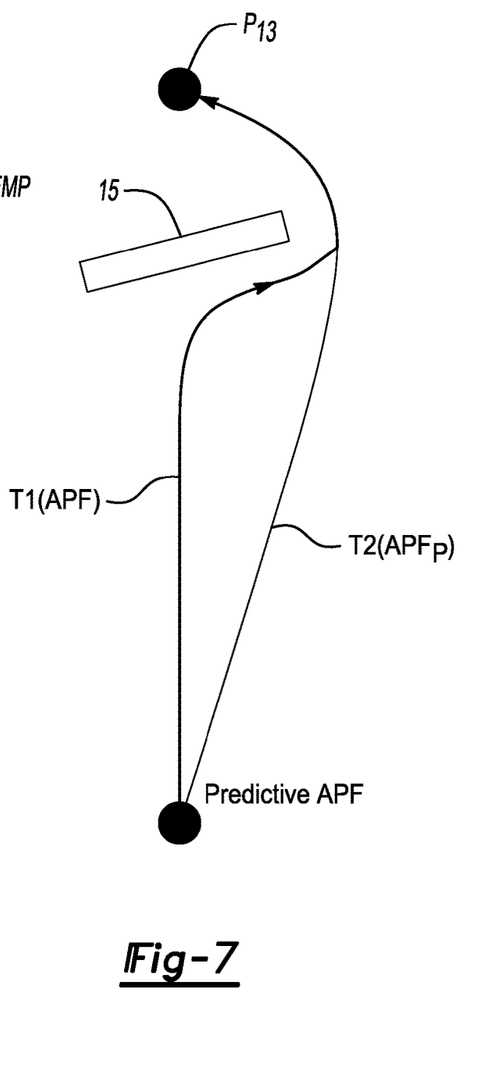

Referring now to FIGS. 6 and 7, exemplary trajectory planning results of the method 50M described above are shown relative to those provided using existing APF techniques. In FIG. 6, for instance, typical APF approaches would result in an initial trajectory $\vec{Fw}^*$ between a starting position and a goal, or points $P_{18}$ and $P_{13}$, respectively. Line-of-sight path planning would follow a straight line (LL) through multiple waypoints 70, with each waypoint 70 having a correspondance distance to the line-of-sight or straight line (LL) between points $P_{18}$ and $P_{13}$. Distances $d_1$, $d_2$, $d_3$, $d_4$, and $d_5$ equal zero, as the corresponding waypoints 70 are located on the straight line (LL). If pure line-of-sht control were to be implemented in the present A3R context, the boom tip E1 corresponding to point $P_{18}$ would eventually contact the obstacle, e.g., the canopy 150 shown in FIG. 5A or another obstacle in its path toward the goal, i.e., point $P_{13}$. Traditional APF trajectory planning could help avoid such a collision by avoiding the obstacle, with the distances $d_6$, $d_7$, and $d_7$ representing points 70 in a trajectory T1 (APF) of FIG. 7 that swings wide of the obstacle before reorienting on the goal, as represented by the smaller distace $d_9$ of FIG. 7.

In contrast, execution of instructions embodying the method 50M as described results in a new temporary goal ($P_{13, TEMP}$) as the farthest point from the straght line (LL). For instance, among the waypoints 70 having corresponding distances $d_1$, $d_2$, $d_3$, . . . , $d_9$, the farthest point from the straight line (LL) is found at distance da. This waypoint 70 becomes the new temporary target ($P_{13, TEMP}$), which in turn changes the trajectory from a straightline trajectory, i.e., initial trajectory $\vec{Fw}^*$, to a revised trajectory $\vec{Fw}$.

As depicted in FIG. 7, therefore, the resulting trajectory path from typical APF teachiniques, i.e., trace T1 (APF), can be compared to a resulting trajectory path T2 ($APF_p$) generated from the present predictive APF approach. The trajectory path T2 ($APF_p$) from a qualitative perspective is more efficient in its motion relative to trace T1 (APF). In the contemplated use scenario in which the end-effector being controlled corresponds to the boom tip E1 and the goal corresponds to the receptacle 13, the practical result of the present teachings is a reduced risk of collision between the refueling boom 18 and the receiver 12 during the A3R process shown in FIG. 1.

Performance of the method 50M by the trajectory planning system 11 of FIGS. 1 and 2 is computationally efficient relative to competing strategies. However, the application of APFs in the course of trajectory planning can result in certain undesirable outcomes. Such outcomes are avoided by aspects of the method 50M as described above.

For example, the refueling boom 18 could become stuck in local minima, or may oscillate in narrow passages around defined boundaries of the obstacles. As appreciated in the art of traditional APF, the ECU 50 may avoid becoming stuck in local minima by applying a rotating APF. This action could entail adding a tangential component to the repulsive forces to perturb the boom tip E1 out of the local minima, e.g., whenever an obstacle is present directly between the refueling boom 18 and the receptacle 13. Additionally, the ECU 50 finds the closest point on the refueling boom 18 to the straight line (LL) and calculating the applied forces at that point.

The problem of oscillation near an obstacle boundary may be resolved by adding a predictive feature to the calculations. For example, the ECU 50 may find the traditional tajectory via APF and thereafter set the farthest deviation from the line-of-sight to the goal as the temporary target. This action is repeated until the boom tip E1 reaches the receptacle 13, as described above with reference to FIG. 4. Use of the method 50M thus produces a shorter path to the receptacle 13 than does traditional APF, which can be seen by comparing traces T1 (APF) and T2 ($APF_p$) of FIG. 7. Finally, while traditional APF techniques do not account for robot kinematic constraints, instead modeling the robot as a single point, the method 50M applied herein considers the fact that the refueling boom 18 is both an extended surface and constrained by virtue of being attached to the tanker 10, and thus modeled as the ray 18R in FIG. 3.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any combinations of the associated listed items. The term "any of" is understood to include any possible combination of referenced items, including "any one of" the referenced items. The term "any of" is understood to include any possible combination of referenced claims of the appended claims, including "any one of" the referenced claims.

For consistency and convenience, directional adjectives may be employed throughout this detailed description corresponding to the illustrated embodiments. Those having ordinary skill in the art will recognize that terms such as "above", "below", "upward", "downward", "top", "bottom", etc., may be used descriptively relative to the figures, without representing limitations on the scope of the invention, as defined by the claims.

The following Clauses provide example configurations of systems and methods for guiding the refueling boom 18 of FIG. 1 during an A3R process in accordance with the disclosure.

Clause 1: A trajectory planning system for use with a fuel-supplying aircraft ("tanker") having a refueling boom configured for delivering aviation fuel to a fuel-receiving aircraft ("receiver"), comprising: a human-machine interface ("HMI") device configured to output electronic control signals; and an electronic control unit ("ECU") in communication with the HMI device and a plurality of sensors operable for outputting sensor data, wherein the ECU is configured, in response to the electronic control signals and the sensor data, to: access a three-dimensional ("3D") receiver boundary model and a 3D boom model of the receiver and the refueling boom, respectively, wherein the 3D receiver boundary model includes one or more receiver features; calculate a boom-to-receiver ("bTr") relative position using the 3D receiver boundary model, the 3D boom model, and the sensor data; calculate a planned trajectory between a boom tip of the refueling boom and a receptacle of the receiver using the bTr relative position and predictive artificial potential fields ("APFs"), including: finding a point on a baseline trajectory of boom tip that is farthest from a straight line between the receptacle and the boom; recording the point on the baseline trajectory as a temporary goal; and shaping the planned trajectory to avoid contact between the boom and the one or more receiver features; and moving the boom tip toward the temporary goal.

Clause 2: The trajectory planning system of clause 1, further comprising the plurality of sensors, wherein the sensors include a rearward-facing camera and a boom resolver respectively configured to output real-time image data and boom position data as the sensor data.

Clause 3: The trajectory planning system of clauses 1 or 2, wherein the 3D receiver boundary model is a multi-faceted model of the receiver providing a simplified representation thereof in fewer than about 500 facets.

Clause 4: The trajectory planning system of any of clauses 1-3, wherein the ECU is configured to output a real-time trajectory graphic to the HMI device, the real-time trajectory graphic being indicative of the planned trajectory.

Clause 5: The trajectory planning system of any of clauses 1-4, wherein the ECU is configured to calculate the bTr relative position as corresponding coordinate sets on the 3D receiver boundary model and the 3D boom model.

Clause 6: The trajectory planning system of any of clauses 1-5, wherein the receiver features include one or more designated keep out zones surrounding the receiver.

Clause 7: The trajectory planning system of any of clauses 1-6, wherein the receiver includes a canopy, and wherein the receiver features include the canopy.

Clause 8: The trajectory planning system of any of clauses 1-7, wherein the ECU is configured to calculate the planned trajectory of the boom tip at least in part by assuming the APFs are applied to the refueling boom as a net force, and then determining a predicted distance and a predicted direction of movement of the refueling boom resulting from the net force, and wherein the ECU is configured to update a pose of the refueling boom in the 3D boom model by moving the boom tip through the predicted distance in the predicted direction.

Clause 9: A method for determining a planned trajectory of a boom tip of a refueling boom connected to a fuel-supplying aircraft ("tanker") when delivering aviation fuel to a fuel-receiving aircraft ("receiver"), the method comprising: accessing a three-dimensional ("3D") receiver boundary model and a 3D boom model of the receiver and the refueling boom, respectively, via an electronic control unit ("ECU"), wherein the 3D receiver boundary model includes one or more predetermined receiver features; calculating a boom-to-receiver ("bTr") relative position via the ECU using the 3D receiver boundary model, the 3D boom model, and sensor data from a plurality of sensors; calculating the planned trajectory between the boom tip and a receptacle of the receiver using the bTr relative position and predictive artificial potential fields ("APFs"), including: finding a point on a baseline trajectory of the refueling boom that is farthest from a straight line between the receptacle and the boom; recording the point on the baseline trajectory as a temporary goal; and shaping the planned trajectory to avoid contact between the boom and the predetermined receiver features; and executing a control action via the ECU using the planned trajectory, including moving the boom tip toward the temporary goal.

Clause 10: The method of clause 9, wherein the sensors include at least one rearward-facing camera and a boom resolver, the method further comprising: receiving real-time image data from the at least one rearward-facing camera; and receiving boom position data from the boom resolver.

Clause 11: The method of clauses 9 or 10, wherein accessing the 3D receiver boundary model includes accessing a multi-faceted model providing a simplified representation of the receiver, the simplified representation of the receiver including fewer than about 500 facets.

Clause 12: The method of any of clauses 9-11, further comprising: outputting a real-time trajectory graphic to a human-machine interface ("HMI") device via the ECU, the real-time trajectory graphic being indicative of the planned trajectory.

Clause 13: The method of any of clauses 9-12, wherein calculating the bTr relative position includes calculating corresponding coordinate sets on the 3D receiver boundary model and the 3D boom model.

Clause 14: The method of any of clauses 9-13, further comprising: recording the one or more predetermined receiver features in the 3D receiver boundary model in memory of the ECU as one or more keep out zones surrounding the receiver.

Clause 15: The method of any of clauses 9-14, wherein recording the one or more predetermined receiver features in the 3D receiver boundary model includes recording an area of a canopy of the receiver as at least one of the predetermined receiver features.

Clause 16: The method of any of clauses 9-15, further comprising: assuming via the ECU that the APFs are applied to the refueling boom as a net force, calculating the planned trajectory at least in part by determining a predicted distance and a predicted direction of movement of the refueling boom; and updating a pose of the refueling boom in the 3D boom model by moving the boom tip over the predicted distance in the predicted direction.

Clause 17: A tanker comprising: a fuselage configured to transport aviation fuel; a refueling boom connected to the fuselage; a boom resolver connected to the fuselage, wherein the boom resolver is configured to measure a position of the refueling boom and output boom position signals indicative thereof; a camera mounted to the fuselage and configured to output real-time image data of the refueling boom and a fuel-receiving aircraft ("receiver"); and a trajectory planning system aboard the fuselage, comprising: a human-machine interface ("HMI") device configured to output electronic control signals; and an electronic control unit ("ECU") in communication with the HMI device, the boom resolver, and the camera, wherein the ECU is configured, in response to the electronic control signals, the boom position signals, and the real-time image data, to: access a three-dimensional ("3D") receiver boundary model a 3D boom model of the receiver and the refueling boom, respectively, wherein the 3D receiver boundary model includes one or more predetermined receiver features; calculate a boom-to-receiver ("bTr") relative position using the 3D receiver boundary model, the 3D boom model, the boom position signals, and the real-time image data; calculate a planned trajectory between a boom tip of the refueling boom and a receptacle of the receiver using the bTr relative position and predictive artificial potential fields ("APFs"), including finding a point on a baseline trajectory of the refueling boom that is farthest from a straight line between the receptacle and the boom, recording the point on the baseline trajectory as a temporary goal, and shaping the planned trajectory to avoid contact between the boom and the one or more predetermined receiver features; and move the boom tip toward the temporary goal.

Clause 18: The tanker of clause 17, wherein the 3D receiver model is a multi-faceted model providing a simplified representation of the receiver, the simplified representation including fewer than about 500 facets.

Clause 19: The tanker of clause 17 or 18, wherein the ECU is configured to output a real-time trajectory graphic to the HMI device that is indicative of the planned trajectory.

Clause 20: The tanker of any of clauses 17-19, wherein the ECU is configured to assume the APFs were to be applied to the refueling boom as a net force, and then calculate the planned trajectory at least in part by determining a predicted distance and a predicted direction of movement of the refueling boom caused by the net force, and wherein the ECU is configured to update a pose of the refueling boom in the 3D boom model by moving the boom over the predicted distance in the predicted direction.

While various embodiments have been described, the description is intended to be exemplary rather than limiting. It will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

What is claimed is:

1. A trajectory planning system for use with a fuel-supplying aircraft ("tanker") having a refueling boom configured to deliver aviation fuel to a fuel-receiving aircraft ("receiver"), the trajectory planning system comprising:
    a human-machine interface ("HMI") device configured to output electronic control signals; and
    an electronic control unit ("ECU") in communication with the HMI device and a plurality of sensors to output sensor data, wherein the ECU is configured, in response to the electronic control signals and the sensor data, to:
        access a three-dimensional ("3D") receiver boundary model of the receiver and a 3D boom model of the refueling boom, respectively, wherein the 3D receiver boundary model includes one or more receiver features;
        calculate a boom-to-receiver ("bTr") relative position using the 3D receiver boundary model, the 3D boom model, and the sensor data;
        calculate a planned trajectory between a boom tip of the refueling boom and a receptacle of the receiver using the bTr relative position and predictive artificial potential fields ("APFs"), including:
            determining a predicted distance and a predicted direction of movement of the refueling boom resulting from a net force, wherein the APFs are applied to the refueling boom as the net force;
            updating a pose of the refueling boom in the 3D boom model by moving the boom tip through the predicted distance in the predicted direction;
            finding a point on a baseline trajectory of the boom tip that is farthest from a straight line between the receptacle and the boom tip;
            recording the point on the baseline trajectory as a temporary goal; and
            shaping the planned trajectory to avoid contact between the refueling boom and the one or more receiver features; and
        moving the boom tip toward the temporary goal.

2. The trajectory planning system of claim 1, further comprising the plurality of sensors, wherein the sensors include a rearward-facing camera and a boom resolver respectively configured to output real-time image data and boom position data as the sensor data.

3. The trajectory planning system of claim 1, wherein the 3D receiver boundary model is a multi-faceted model of the receiver providing a simplified representation thereof in fewer than 500 facets.

4. The trajectory planning system of claim 1, wherein the ECU is configured to output a real-time trajectory graphic to the HMI device, the real-time trajectory graphic being indicative of the planned trajectory.

5. The trajectory planning system of claim 1, wherein the ECU is configured to calculate the bTr relative position as corresponding coordinate sets on the 3D receiver boundary model and the 3D boom model.

6. The trajectory planning system of claim 1, wherein the receiver features include one or more designated keep out zones surrounding the receiver.

7. The trajectory planning system of claim 1, wherein the receiver includes a canopy, and wherein the receiver features include the canopy.

8. The trajectory planning system of claim 1, wherein the predicted direction is of the net force, and wherein the ECU is to update the pose of the refueling boom in the 3D boom model by updating an orientation of the 3D boom model in the predicted direction of the net force.

9. A method for determining a planned trajectory of a boom tip of a refueling boom when delivering aviation fuel to a fuel-receiving aircraft ("receiver"), the method comprising:
    accessing a three-dimensional ("3D") receiver boundary model of the receiver and a 3D boom model of the refueling boom, respectively, via an electronic control unit ("ECU"), wherein the 3D receiver boundary model includes one or more predetermined receiver features;
    calculating a boom-to-receiver ("bTr") relative position via the ECU using the 3D receiver boundary model, the 3D boom model, and sensor data from a plurality of sensors;
    calculating the planned trajectory between the boom tip and a receptacle of the receiver using the bTr relative position and predictive artificial potential fields ("APFs"), including:
        determining a predicted distance and a predicted direction of movement of the refueling boom, wherein the APFs are applied to the refueling boom as a net force;

updating a pose of the refueling boom in the 3D boom model by moving the boom tip over the predicted distance in the predicted direction;

finding a point on a baseline trajectory of the refueling boom that is farthest from a straight line between the receptacle and the boom tip;

recording the point on the baseline trajectory as a temporary goal; and shaping the planned trajectory to avoid contact between the refueling boom and the predetermined receiver features; and executing a control action via the ECU using the planned trajectory, including moving the boom tip toward the temporary goal.

10. The method of claim 9, wherein the sensors include at least one rearward-facing camera and a boom resolver, the method further comprising:

receiving real-time image data from the at least one rearward-facing camera; and receiving boom position data from the boom resolver.

11. The method of claim 9, wherein the accessing of the 3D receiver boundary model includes accessing a multi-faceted model providing a simplified representation of the receiver, the simplified representation of the receiver including fewer than 500 facets.

12. The method of claim 9, further comprising:

outputting a real-time trajectory graphic to a human-machine interface ("HMI") device via the ECU, the real-time trajectory graphic being indicative of the planned trajectory.

13. The method of claim 9, wherein the calculating of the bTr relative position includes calculating corresponding coordinate sets on the 3D receiver boundary model and the 3D boom model.

14. The method of claim 9, further comprising:

recording the one or more predetermined receiver features in the 3D receiver boundary model in memory of the ECU as one or more keep out zones surrounding the receiver.

15. The method of claim 9, further including recording the one or more predetermined receiver features in the 3D receiver boundary model by recording an area of a canopy of the receiver as at least one of the predetermined receiver features.

16. The method of claim 9, wherein the predicted direction is of the net force, and wherein the updating of the pose of the refueling boom in the 3D boom model is performed by updating an orientation of the 3D boom model in the predicted direction of the net force.

17. A tanker comprising:

a fuselage configured to transport aviation fuel;

a refueling boom connected to the fuselage;

a boom resolver connected to the fuselage, wherein the boom resolver is configured to measure a position of the refueling boom and output boom position signals indicative thereof;

a camera mounted to the fuselage and configured to output real-time image data of the refueling boom and a fuel-receiving aircraft ("receiver"); and a trajectory planning system aboard the fuselage, the trajectory planning system comprising:

a human-machine interface ("HMI") device configured to output electronic control signals; and an electronic control unit ("ECU") in communication with the HMI device, the boom resolver, and the camera, wherein the ECU is configured, in response to the electronic control signals, the boom position signals, and the real-time image data, to:

access a three-dimensional ("3D") receiver boundary model of the receiver and a 3D boom model of the refueling boom, respectively, wherein the 3D receiver boundary model includes one or more predetermined receiver features;

calculate a boom-to-receiver ("bTr") relative position using the 3D receiver boundary model, the 3D boom model, the boom position signals, and the real-time image data;

calculate a planned trajectory between a boom tip of the refueling boom and a receptacle of the receiver using the bTr relative position and predictive artificial potential fields ("APFs"), including:

determining a predicted distance and a predicted direction of movement of the refueling boom caused by a net force, the APFs applied to the refueling boom as the net force, update a pose of the refueling boom in the 3D boom model by moving the boom tip over the predicted distance in the predicted direction, finding a point on a baseline trajectory of the refueling boom that is farthest from a straight line between the receptacle and the boom tip, recording the point on the baseline trajectory as a temporary goal, and shaping the planned trajectory to avoid contact between the refueling boom and the one or more predetermined receiver features; and move the boom tip toward the temporary goal.

18. The tanker of claim 17, wherein the 3D receiver boundary model is a multi-faceted model providing a simplified representation of the receiver, the simplified representation including fewer than 500 facets.

19. The tanker of claim 17, wherein the ECU is configured to output a real-time trajectory graphic to the HMI device that is indicative of the planned trajectory.

20. The tanker of claim 17, wherein the predicted direction is of the net force, and wherein the ECU is to update the pose of the refueling boom in the 3D boom model by updating an orientation of the 3D boom model in the predicted direction of the net force.

* * * * *